C. H. Bassett,
Harness Trimmings,
N° 84,080. Patented Nov. 17, 1868.

Witnesses:
P. H. Shumway
A. J. Tibbits

Inventor,
Charles H. Bassett
By his Attorney
John E. Earle

United States Patent Office.

CHARLES H. BASSETT, OF DERBY, CONNECTICUT.

Letters Patent No. 84,080, dated November 17, 1868.

IMPROVED CHECK-HOOK FOR HARNESS.

The Schedule referred to in these Letters Patent and making part of the same.

*To all whom it may concern:*

Be it known that I, CHARLES H. BASSETT, of Derby, in the county of New Haven, and State of Connecticut, have invented a new Improvement in Check-Hook for Harness; and I do hereby declare the following, when taken in connection with the accompanying drawings, and the letters of reference marked thereon, to be a full, clear, and exact description of the same, and which said drawings constitute part of this specification, and represent, in—

Figure 1:
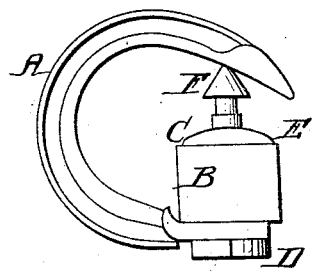
Figure 2:
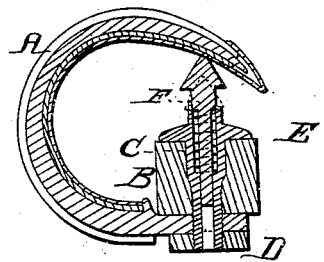
Figure 3:
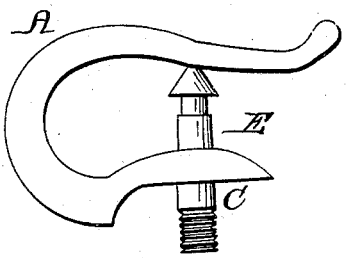

Figure 1, a side view;

Figure 2, a central section of the same;

Figure 3, a side view; and in

Figure 4:
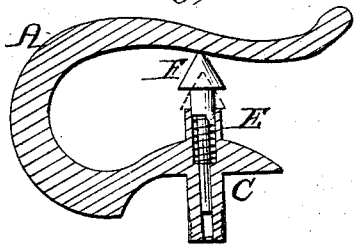

Figure 4, a sectional view, of a different construction of the same invention.

This invention relates to an improvement in what are known to the trade as "check-hooks," that is, a hook fixed upon the saddle of the harness for the purpose of securing the check-rein, the object of the invention being the arrangement of a spring so that the rein cannot be accidentally disconnected; and the invention consists in the arrangement of a conical-headed stud into the bolt or seat beneath the hook, and provided with a spring, which supports the said stud vertically against the said hook, so as to close the opening of the hook.

To enable others to make and use my improvement, I will fully describe the same, as illustrated in the accompanying drawings.

A is the hook, of common construction, fixed to the saddle-tree B by a bolt, C, and nut D, in the usual manner, as clearly seen in fig. 2, so as to leave an opening, E, through which the rein may be passed.

To close the said opening, I bore out the bolt, as seen in fig. 2, and insert therein a conical-headed spindle, F, resting upon a spring within the said bolt, so that, when free, the spring will force the stud or spindle up against the hook, as seen in fig. 1, and thus close the opening.

The object of making the head of the spindle conical is that it may offer such an inclination to the rein, when presented, that the forcing of the rein into or out of the hook will cause the depression of the spindle, without the intervention of other means, so as to permit the free passage of the hook in or out when properly presented to the inclined head of the spindle, a position which the rein cannot by accident assume.

In figs. 3 and 4, I show a common and cheaper construction of the hook, in which the bolt C is formed or cast upon the base of the hook itself, and the hook set upon the upper surface of the saddle-tree, instead of under, as in the first illustration. This is bored out, so as to receive the spindle, which is arranged in the same manner as the first described.

I do not wish to be understood as broadly claiming a spring, arranged for closing the hook, whether the spring operates directly or indirectly through a tongue hinged, or through a hollow vertical sleeve, as such, I am aware, is common and well known; but, having fully described my invention, What I do claim as new and useful, and desire to secure by Letters Patent, is—

The arrangement of the conical-headed spindle F through the bolt or base of the hook, and provided with a spring, arranged within the body of the bolt and spindle, so as to operate in the manner herein set forth.

CHAS. H. BASSETT.

Witnesses:
A. J TIBBITS,
J. H. SHUMWAY.